(12) United States Patent
Wouhaybi et al.

(10) Patent No.: US 9,734,531 B2
(45) Date of Patent: Aug. 15, 2017

(54) DETERMINING A PROFILE FOR A RECOMMENDATION ENGINE BASED ON GROUP INTERACTION DYNAMICS

(75) Inventors: Rita H. Wouhaybi, Portland, OR (US); Audrey C. Younkin, Beaverton, OR (US); William C. Deleeuw, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 380 days.

(21) Appl. No.: 13/992,056

(22) PCT Filed: May 30, 2012

(86) PCT No.: PCT/US2012/039985
§ 371 (c)(1),
(2), (4) Date: Jun. 6, 2013

(87) PCT Pub. No.: WO2013/180704
PCT Pub. Date: Dec. 5, 2013

(65) Prior Publication Data
US 2013/0325655 A1 Dec. 5, 2013

(51) Int. Cl.
*G06Q 30/06* (2012.01)
(52) U.S. Cl.
CPC .................. *G06Q 30/0631* (2013.01)
(58) Field of Classification Search
CPC .................. G06Q 30/0631; G06Q 30/06

USPC ................................. 705/26.1, 26.7
See application file for complete search history.

(56) References Cited

U.S. PATENT DOCUMENTS

| | | | |
|---|---|---|---|
| 2005/0131918 A1 | 6/2005 | Hillis et al. | |
| 2007/0016553 A1* | 1/2007 | Dumais et al. | 707/2 |
| 2010/0064040 A1 | 3/2010 | Wise et al. | |
| 2010/0211884 A1* | 8/2010 | Kashyap | H04N 7/163 715/745 |
| 2010/0299431 A1 | 11/2010 | Vanderhook et al. | |
| 2012/0078725 A1 | 3/2012 | Maitra et al. | |
| 2012/0089437 A1 | 4/2012 | Amento et al. | |
| 2013/0018718 A1* | 1/2013 | Cumming | 705/14.41 |
| 2013/0103814 A1* | 4/2013 | Carrasco et al. | 709/223 |
| 2013/0290070 A1* | 10/2013 | Abraham et al. | 705/7.33 |

OTHER PUBLICATIONS

PCT Notification of Transmittal of the Internal Search Report and the Written Opinion of the Internal Searching Authority, or the Declaration, Aug. 21, 2013.

* cited by examiner

*Primary Examiner* — Mila Airapetian
(74) *Attorney, Agent, or Firm* — Trop, Pruner & Hu, P.C.

(57) ABSTRACT

A technique includes using a processor-based machine to determine a dynamic interaction characteristic of a group of users. The technique further includes, based at least in part on the determined dynamic interaction characteristic, determining a profile of the group for a recommendation engine.

37 Claims, 4 Drawing Sheets

DETERMINING A PROFILE FOR A RECOMMENDATION ENGINE BASED ON GROUP INTERACTION DYNAMICS

BACKGROUND

A content provider, such as a provider of streaming movie rentals, may use a recommendation engine to generate suggested recommendations of future content to be viewed by its subscribers. More specifically, when generating a recommendation for a given subscriber, the recommendation engine may take into account that the subscriber has indicated a preference for viewing certain movie genres; a history of the subscriber viewing certain movie genres; favorite movies, shows and genres of the subscriber; and feedback from the subscriber regarding recommendations previously provided by the recommendation engine.

DETAILED DESCRIPTION

Systems and techniques are disclosed herein for purposes of determining the profile of a group of individual users so that the determined profile may be used by a recommendation engine to determine a suggested recommendation for content (movie, television, or audio content, as a few examples) that may be accessed (viewed, for example) by the group. The users may be, as examples, family members, business colleagues, friends, and so forth who are gathered together (in the same room or possibly at different locations) for purposes of simultaneously accessing content (or at least having the ability to simultaneously access the content) provided by a content provider. The content provider may be (as examples) a movie rental provider, a streaming audio service, a television content provider, an Internet-based content provider, and so forth. Moreover, at least one of the individual users of the group may be an account holder with the content provider. The account may be a subscription-based account or a non-subscription-based account, depending on the particular implementation.

The recommendations may be part of the services that are provided by the content provider. In contrast to generating a recommendation solely based on an individual user profile (the account holders profile, for example), due to the techniques and systems that are disclosed herein, the recommendation engine takes into account the dynamics of the entire group.

In this manner, a recommendation for a group that is provided by a recommendation engine based solely on an individual user profile may be relatively inaccurate. Moreover, a recommendation for a group generated based on a merger of individual user profiles for the users of a group may be relatively inaccurate, if group dynamics are not taken into account. Thus, profiles of Person A and Person B may not necessarily be meshed together to form an accurate profile for a group that includes Persons A and B without considering how Person A interacts with Person B.

Figure 1:
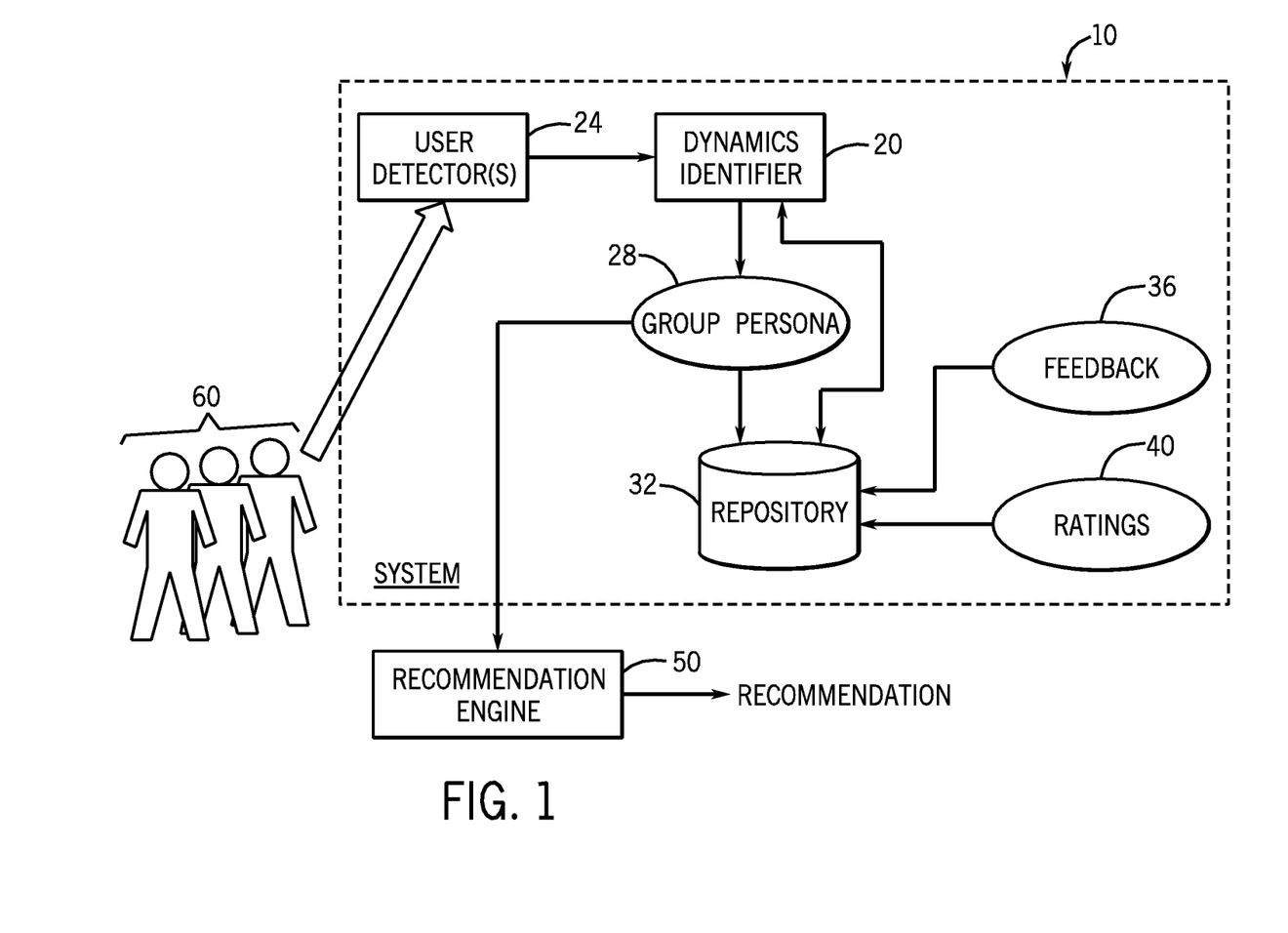
FIGS. 1 and 4 are schematic diagrams of systems to generate group profiles for a recommendation engine according to exemplary implementations.

Referring to FIG. 1, to address this concern, FIG. 1 depicts an exemplary system 10, which determines a group profile, called a "group persona 28" herein, for a recommendation engine 50. The group persona 28 indicates a profile for a given group of individual users 60 and is based at least in part on observed/determined group dynamics of the users 60.

More specifically, in accordance with implementations that are disclosed herein, a dynamics identifier 20 of the system 10 determines the group persona 28 by considering individual profiles of the users 60 and the behaviors of the different individual users 60 of the group, as the users 60 interact with each other and possibly form different subgroups. This interaction, in turn, is referred to as the "group dynamics" herein and may take into account one or more of the following. One of the individual users 60 may be more dominant relative to the rest of the group and thus, may have "veto power." For example, such a scenario may be the case in which a parent and a child are watching a movie together; and the parent for this example, is the more dominant user of the group.

As another example, one of the users 60 may be relatively disengaged from the rest of the group, such as the case, for example, when one of the users 60 browses the Internet or reads a newspaper, while the remaining users 60 watch television. As another example, one or more of the users 60 may be particularly interested in live broadcast television content, while the remaining user(s) 60 may be relatively indifferent to whether a broadcast is live or not. One or more of these dynamic group interaction characteristics, as well as other/different dynamic group interaction characteristics may be considered by the dynamics identifier 20 for purposes of generating the group persona 28.

The dynamics identifier 20 may consider factors other than the group dynamics in the generation of the group persona 28, in accordance with some implementations. For example, in accordance with some implementations, the dynamics identifier 20 may consider user-provided feedback 36 of past recommendations provided by the recommendation engine 50 as well as content ratings 40 that are provided by the individual users 60. A content rating 40 may be, as an example, a rating of a movie by a user 60 and may be compiled with other ratings 40 by the user to generate a profile for the user 60, indicating the user's preferences for certain actors, actresses, film eras, movie genres, directors and so forth.

It is noted that depending on the particular implementation, the recommendation engine 50 may or may not be part of the system 10. The recommendation engine 50 may or not be associated with the content provider. Moreover, the recommendation engine 50 may be locally or remotely disposed with respect to the system 10.

The feedback 36 and/or the ratings 40 may be entered via components of the system 10, in accordance with some implementations. However, in accordance with further implementations, the feedback 36 and/or the ratings 40 may be entered by components that are not part of the system 10. For example, in accordance with some implementations, the feedback 36 and/or ratings 40 may be entered via a user interface that is provided by an Internet server (a web site affiliated with the content provider, for example). Thus, many variations are contemplated, which are within the scope of the appended claims.

Figure 2:
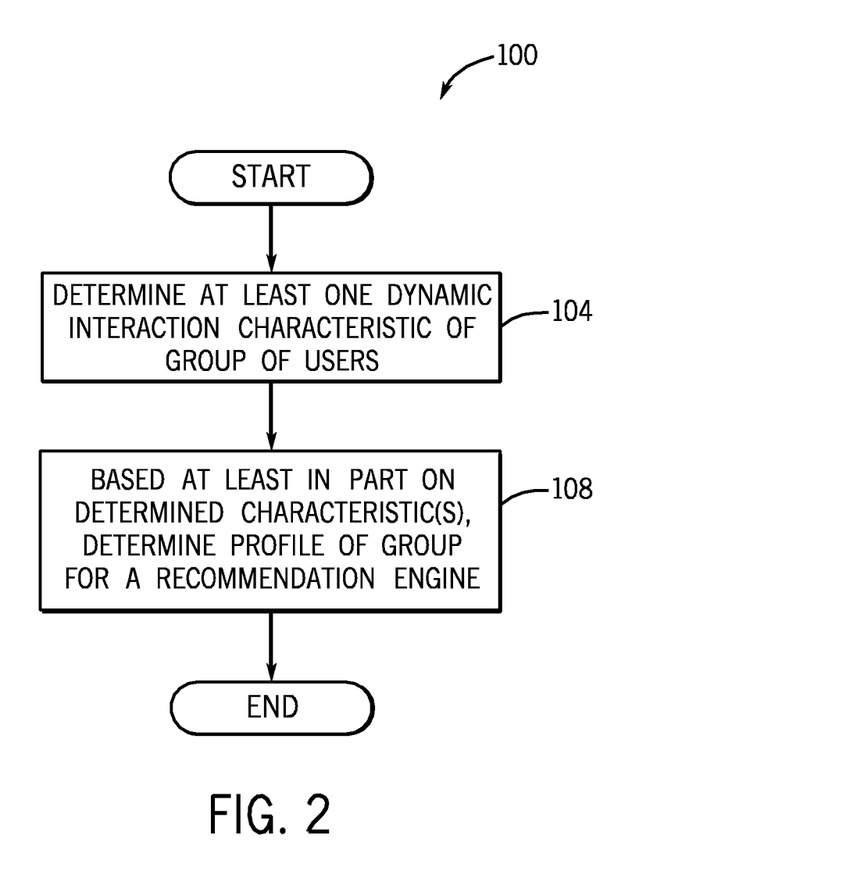
FIGS. 2 and 3 are flow diagrams depicting techniques to determine group profiles for a recommendation engine according to exemplary implementations.

Referring to FIG. 2 in conjunction with FIG. 1, in summary, in accordance with exemplary implementations, a technique 100 may be used to determine a profile of a group of users for a recommendation engine 50 so that the recommendation engine 50 may provide a recommendation of future suggested content to be accessed by the group. The technique 100 includes determining (block 104) at least one dynamic interaction characteristic of a group of users and based at least in part on the determined characteristic(s), determine a profile of the group, pursuant to block 108.

Referring to FIG. 1, among its other features, in accordance with some implementations, the system 10 includes a repository 32, which stores data indicative of previously generated individual and group personas 28, data indicative of the feedback 36 as well as data indicative of the content ratings 40. Although the depository 32 is depicted in FIG. 1 as being part of the system 10, the repository 32 may be external or remotely located with respect to other components of the system 10, in accordance with further implementations.

The system 10 also includes one or multiple user detectors 24, in accordance with some implementations. In general, the user detector(s) 24 may be used for one or more of the following purposes: detection of the presence of one or more of the users 60; recognition of the identity of one or more of the users 60; detection of the group interaction and level of engagement of one or more of the users 60; and so forth.

As a non-limiting example, the user detector(s) 24 may include a camera that acquires a user image and an image processor, which performs such functions as recognizing the user and detecting the engagement of the user in the content-related focus activity (watching a movie, for example) of the group. For example, using a facial recognition technique, the user detector 24 may identify a particular user 60; and for this purpose, the user detector 24 may compare facial characteristics of the user 60 to find characteristics stored in a library. Through image recognition, for example, a given user detector 24 may further determine that a particular user is not watching a television, for example, but instead, is engaged in talking with another user 60, concentrating on subject matter outside of the room, reading a book, browsing the Internet, working a portable computer, and so forth.

In further implementations, a particular user detector 24 may be formed at least in part by an application on a smartphone, which communicates with the dynamics identifier 20 data regarding interaction of the user 60 with the smartphone. In this regard, if the user 60 is consuming a certain amount of time engaging the smartphone, then the dynamics identifier 20 may consider the user 60 as being only slightly engaged with the content-recited focus activity of the group. As another example, a given user detector 24 may be formed at least in part by software executing on a portable computer or by an application on a smartphone, which allows a given user 60 to log in and log out to indicate whether the user 60 is engaged. Such software may also execute on a content viewing device, such as a television, in accordance with further implementations.

The dynamics identifier 20 develops individual user profiles based on such information as input from the user detector(s) 24 and input from the repository 32 regarding such factors as the feedback 36, content ratings 40, previously-determined user profiles, current user behavior and so forth. In accordance with exemplary implementations, the dynamics identifier 20 uses the time when a user watches content, such as video, alone in order to determine the user's individual profile characteristics. This could also include the video watched online and through streaming and traditional TV viewing. The dynamics identifier 20 combines the individual user profiles for the users of a given group based at least in part on the observed way in which the users interact with each other. As a more specific example, in accordance with some implementations, the dynamics identifier 20 may determine individual user profiles and then select one of a group of algorithms, which control how the dynamics identifier 20 combines the individual user profiles to generate the group persona 28.

The following examples assume individual users called "X" and "Y" herein. The dynamics identifier 20 uses such information as the content that X user watches alone, content preferences indicated by the X user, and observed behavior of the X user to generate a set of metadata and associated weights, which collectively form the profile (called "$Prof_X$" herein) of the X user. The $Prof_X$ profile may be described as a set of N tuples of "<keyword,weight>," as set forth below:

$$Prof_X = \{<K_{1X}, W_{1X}>, <K_{2X}, W_{2X}>, <K_{3X}, W_{3X}>, \ldots, <K_{NX}, W_{NX}>\}, \quad \text{Eq. 1}$$

where "$K_{1X} \ldots K_{NX}$" represent the N metadata, or keywords of the X user; and "$W_{1X} \ldots W_{NX}$" represents the corresponding N weights that are respectively associated with the N keywords. As examples, when applied to movie content, the keywords may be one or more of the following: specific actors, actresses, directors, genres, movie copyright year ranges and so forth. Moreover, the keywords may indicate preferences for the type of content, such as pre-recorded content, television live broadcast, situation comedies, news casts, streaming content, and so forth.

Each weight which may be a real-number in the range of 0 to 1 in accordance with some implementations to indicate the relative importance of the keyword in the user's profile. For example, a weight of "0.1" for a comedy genre keyword may indicate that the user occasionally watches comedies; and a weight of "0.9" for a drama genre may indicate that the user more often watches movies associated with drama content. The dynamics identifier 20 may assign the weights based on a number of different factors, such as observed user behavior, user-entered preferences, and so forth.

For the following example, the Y user may have the following profile "$Prof_Y$" of M tuples:

$$Prof_Y = \{<K_{1Y}, W_{1Y}>, <K_{2Y}, W_{2Y}>, <K_{3Y}, W_{3Y}>, \ldots, <K_{MY}, W_{MY}>\} \quad \text{Eq. 2}$$

It is noted that the user profiles may have the same or different number of tuples (i.e., N may be the same, greater than or less than M, for this example), depending on the particular implementation.

Based on the observed dynamic interaction characteristics of the group, which for this example is assumed to include users X and Y, the dynamics identifier 20 selects one of a group of algorithms for purposes of combining the $Prof_X$ and $Prof_Y$ profiles. The algorithms may include what is labeled a "common algorithm" herein, which creates a group persona 28 (called "$Prof_1$," herein), which is based on the intersection of $Prof_X$ and $Prof_Y$. The keywords of the $Prof_1$ group persona 28 are the keywords that are shared in common by the $Prof_X$ and $Prof_Y$ profiles; and for every keyword, the associated weight is the minimum of the weights of the $Prof_X$ and $Prof_Y$ profiles, as described below:

$$\text{Keywords of } Prof_1 = [K_{1X}, \ldots, K_{NX}] \cap [K_{1Y}, \ldots, K_{NY}], \text{ and} \quad \text{Eq. 3}$$

$$\text{Weights of } Prof_1 = \min(W_X, W_Y), \quad \text{Eq. 4}$$

where "∩" represents the intersection set operator.

In general, in accordance with example implementations, the dynamics identifier 20 may select the common algorithm based on the group preferring recommendations using such an algorithm. In accordance with exemplary implementations, the dynamics identifier 20 uses all of these algorithms for combining profiles in order to generate recommendations and then watches the behavior of the user and which recommendations that the user favored. As example implementations, detecting such recommendations may be performed by passively by watching what was selected to be viewed by the users, or through active querying of the users to solicit their ratings of the recommendations.

As an example of another algorithm for combining the user profiles, the dynamics identifier 20 may select what is called a "union algorithm" herein to create a new group persona 28 (called "$Prof_2$" herein), which is based on the union of the $Prof_X$ and $Prof_Y$ profiles. Because of the union, the keywords in the $Prof_2$ group persona 28 are all of the keywords contained in both the $Prof_X$ and $Prof_Y$ profiles; and the weights of the $Prof_2$ group persona 28 are the summation of the weights in the $Prof_X$ and $Prof_Y$ profiles, as described below:

$$\text{Keywords of Prof}_2 = [K_{1X}, \ldots, K_{NX}] \cup [K_{1Y}, \ldots, K_{NY}], \text{ and} \quad \text{Eq. 5}$$

$$\text{Weights of Prof}_2 = W_X + W_Y, \quad \text{Eq. 6}$$

where "$\cup$" represents the union set operator. For the union algorithm, if a given keyword does not exist in one of the $Prof_X$ and $Prof_Y$ profiles, then the associated weight of that profile is assumed to be zero, in accordance with exemplary implementations.

The dynamics identifier 20 may further select an algorithm, which is more heavily weighted to the preferences of a particular user of the group. This selection occurs when the dynamics identifier 20 determines, for example, that the more heavily weighted user is the dominant decision maker of the group. As examples, the other individual(s) of the group may be relatively disengaged from the focus activity of the group, the heavily weighted decision maker may be a user who watches more TV and is more vested in what will be displayed, and so forth. Other counter-intuitive examples could include heavily weighing towards the profile of a child despite the presence of a parent since what a child watches typically is appropriate for an adult, but not vice versa. As a more specific example, if the dynamics identifier 20 identifies the X user as being a dominant decision maker of the group, then the dynamics identifier 20 may generate a group persona 28 (called "$Prof_3$" herein), which is based on the weighted combination of the $Prof_X$ and $Prof_Y$ profiles, as set forth below:

$$\text{Keywords of Prof}_3 = [K_{1X}, \ldots, K_{NX}] \cup [K_{1Y}, \ldots, K_{NY}], \text{ and} \quad \text{Eq. 7}$$

$$\text{Weights of Prof}_3 = \alpha W_X + \beta W_Y, \quad \text{Eq. 8}$$

where the "$\alpha$" is a real number in the range of 0 to 1, which is used to weight the weights of the $Prof_X$ profile; and "$\beta$" is a real number in the range of 0 to 1, which is used to weight the weights of the $Prof_Y$ profile, such that $\alpha > \beta$ and $\alpha + \beta = 1$. For example, the $\alpha$ weight may be 0.7, and the $\beta$ weight may be 0.3, thereby assigning relatively more weights to the keywords of the $Prof_X$ profile.

Continuing the example from above, if the dynamics identifier 20 alternatively determines that the Y user (instead of the X user) is the relatively dominant decision maker of the group, then the dynamics identifier 20 may select an algorithm, which prefers the $Prof_Y$ profile. In this regard, the dynamics identifier 20, in using this algorithm, assumes that the keywords of the $Prof_Y$ profile should receive relatively more weight. As a result, the dynamics identifier 20 determines a group persona 28 (called "$Prof_4$") that is based on a weighted combination of the $Prof_X$ and $Prof_Y$ profiles, which prefers the $Prof_Y$ profile, as set forth below:

$$\text{Keywords of Prof}_4 = [K_{1X}, \ldots, K_{NX}] \cup [K_{1Y}, \ldots, K_{NY}], \text{ and} \quad \text{Eq. 9}$$

$$\text{Weights of Prof}_4 = \alpha W_X + \beta W_Y. \quad \text{Eq. 10}$$

For this example, the $\alpha$ weight may be 0.3 and the $\beta$ weight may be 0.7, thereby assigning relatively more weights to the keywords of the $Prof_Y$ profile. Note that for the same 2 users X and Y, the dynamics identifier could select one algorithm in certain cases and another algorithm for other cases, situations and context. The algorithm does not have to be the same at all times for the same users.

Figure 3:
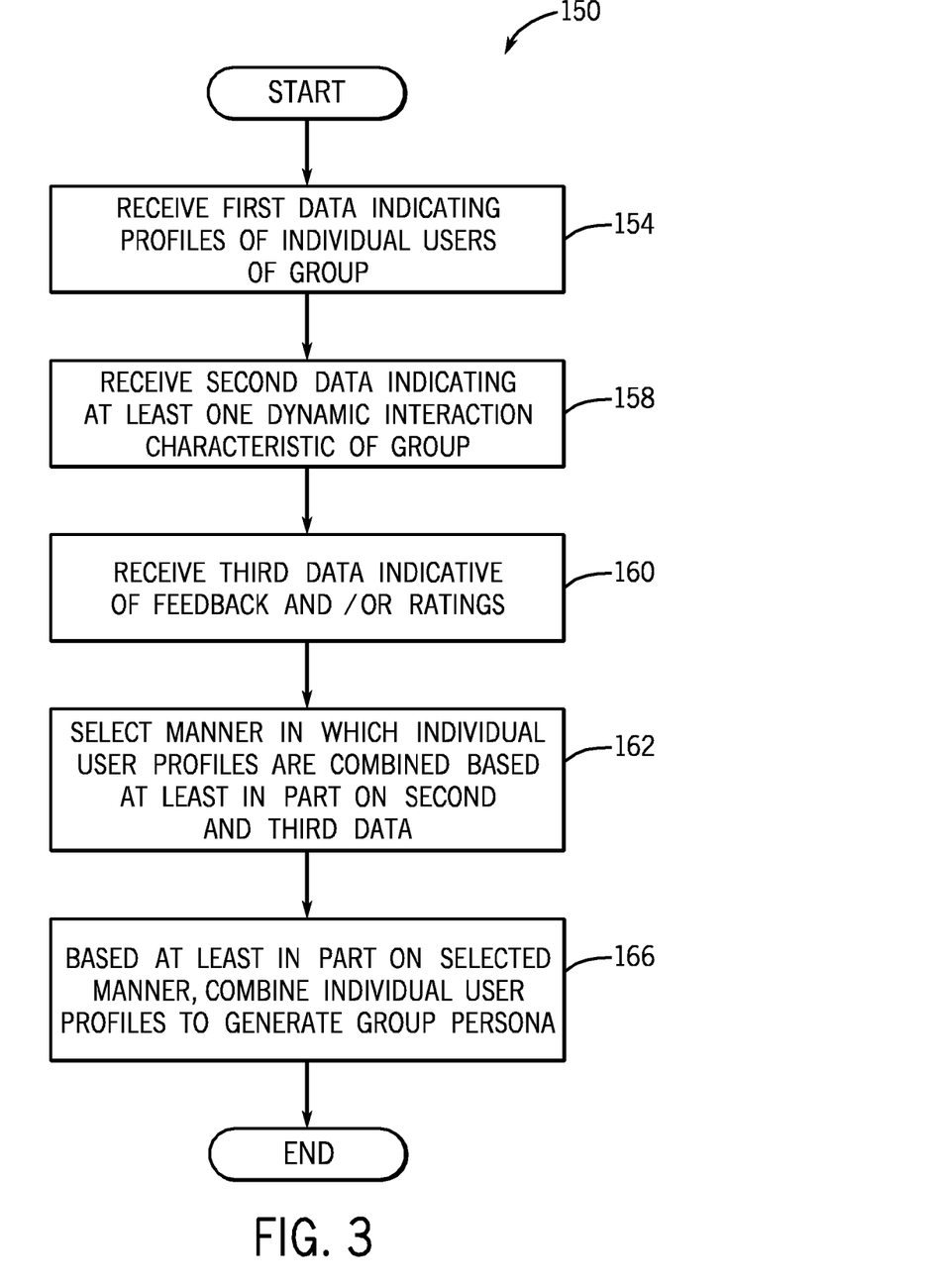

Thus, referring to FIG. 3, a technique 150 in accordance with exemplary implementations may be used to generate a group profile, or group persona for a group of users. The technique 150 includes receiving (block 154) first data indicating profiles of individual users of a group and receiving (block 158) second data indicating at least one dynamic interaction characteristic of the group. The technique 150 may further include receiving (block 160) third data indicative of feedback and/or ratings. Based at least in part on the second and third data, the technique 150 includes selecting a manner in which the individual user profiles are combined, pursuant to block 162. Based at least in part on this selected manner, the technique 150 includes combining (block 166) individual user profiles to generate a group persona.

Referring back to FIG. 1, in accordance with some implementations, due to the creation of the group persona 28, the persona 28 may be used with an existing recommendation engine 50 that has traditionally provided recommendations based solely on individual user profiles, as the group persona 28 may be perceived from the perspective of the engine 50, as being the persona of an individual user. Moreover, due to the providing of the group persona 28, users are afforded a significant degree of privacy, allowing their data to be captured but abstracted when potentially sent to third party services (such as the third party service using the recommendation engine 50, for example). In this manner, the recommendation engine 50 may be unaware, for example, that the monitored group is a group of two children and a parent, where the children are watching television and the parent is reading the newspaper. Thus, the group persona 28 allows the composition of the group as well as the individual preferences to remain anonymous while still allowing the recommendation engine 50 to provide a satisfactory recommendation based on the users in the room and their group interaction dynamics.

In general, the system 10 may take on one of numerous forms, depending on the particular implementation. As non-limiting examples, the system 10 may be a portable computer; an interactive gaming system; a smartphone; a set-top box; a television; a combination of one or more of these devices; and so forth.

Figure 4:
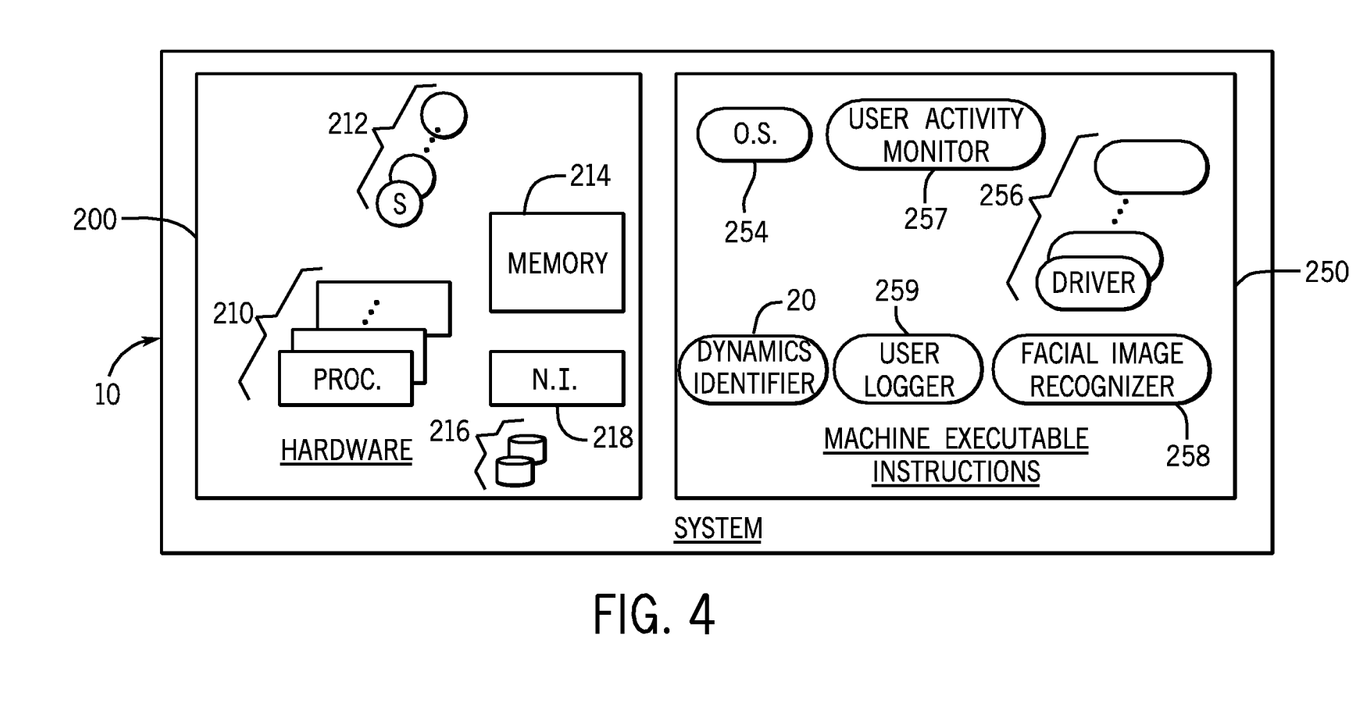

Referring to FIG. 4, as a non-limiting example, in accordance with exemplary implementations, the system 10 may include hardware 200, such as one or more processors 210 (central processing units (CPUs), processing cores, microprocessors, microcontrollers, and so forth); one or more sensors 212 (cameras; microphones; processor-based reporting devices, such as portable computers, web servers, or smartphones executing user logging or user recognition software, for example; and so forth), a memory 214 (storing program instructions, for example); one or more disk drives 216 (storing data for the repository 32 of FIG. 1, for example); a network interface 218; and so forth.

In general, the memory 214 is a non-transitory memory that is formed from one or more of the following memory devices: semiconductor memory devices; phase change memory devices; optical storage devices; magnetic storage devices; and so forth. The memory 214 may store program instructions that when executed by one or more of the processor(s) 210 cause the processor(s) 210 to perform at least some of one or more of the techniques that are disclosed herein, such as the techniques 100 and 150, for example. In this manner, these executing instructions may form one or more of the following: the dynamics identifier 20; system software; and applications to recognize/identify the users 60.

More specifically, the processor(s) 210 may execute one or more machine executable instructions 250 (i.e., "software"), which are stored in the memory 214 or other non-transitory memory, for purposes of performing one or more functions of the system 10. In this manner, the machine executable instructions 250, when executed by the processor(s) 210, may cause the processor(s) 210 to form the dynamics identifier 20; form a user logger 259 to track which user is currently logged in; form a user activity monitor 257 (to monitor whether a given user is using an electronics device, browsing the Internet, and so forth); form a facial image recognizer 258; form one or more device drivers 256; form an operating system 254; and so forth.

In general, in accordance with some implementations, the system 10 is a physical machine that is made up of actual software and hardware. It is noted that the software components of the system 10 may be implemented in one or more virtual machines, in accordance with some implementations. Moreover, although the system 10 is depicted in the figures as being contained in a box, it is understood that the system 10 may be a distributed system, which is distributed among multiple nodes. Thus, many implementations other than those that are specifically disclosed herein are contemplated and are within the scope of the appended claims.

The following examples pertain to further implementations.

In an example implementation, a technique includes using a processor-based machine to determine at least one dynamic interaction characteristic of a group of users; and based at least in part on the determined dynamic interaction characteristic(s), determine a profile of the group for a recommendation engine.

In some implementations, the technique includes determining a profile of at least one of the users; and further basing the determination of the profile of the group based at least in part on the determined user profile.

In some implementations, using the processor-based machine to determine the dynamic interaction characteristic(s) includes determining an engagement of at least one of the users with an activity being performed by the group.

In some implementations, using the processor-based machine to determine the dynamic interaction characteristic(s) includes determining an age of at least one of the users.

In some implementations, using the processor-based machine to determine the dynamic interaction characteristic(s) includes processing input data provided by at least one of the users.

In some implementations, the technique includes determining profiles of the users, and the determination of the profile of the group includes selectively combining the determined user profiles based at least in part on the determined dynamic interaction characteristic(s).

In some implementations, combining the determined user profiles includes combining the user profiles based at least in part on a determined degree of similarity among the determined profiles.

In some implementations, combining the determined user profiles includes combining the user profiles based at least in part on determined engagements of the users in an activity being performed by the group.

In some implementations, each of the profiles includes keywords associated with preferences of the associated user, and combining the profiles includes performing an intersection of the keywords.

In some implementations, each of the profiles includes keywords associated with preferences of the associated user, and combining the profiles includes performing a union of the keywords.

In some implementations, at least one machine readable medium includes a plurality of instructions that in response to being executed on a computing device, cause the computing device to carry out a method according to any of the above-described techniques.

In some implementations, an apparatus includes a processor that is adapted to perform any of the above-described techniques.

In some implementations, an apparatus includes at least one sensor and a processor-based dynamics identifier. The sensor(s) indicate an activity of at least one user of a plurality of users of a group; and the dynamics identifier determines at least one dynamic interaction characteristic of the group and determines a profile of the group for a recommendation engine based at least in part on the determined characteristic(s).

In some implementations, the sensor(s) include one or more of a camera, an application and an audio input device.

In some implementations, the dynamics identifier is adapted to determine the profile based at least in part on at least one rating provided by at least one of the users.

In some implementations, the dynamics identifier is adapted to determine the dynamic interaction characteristic(s) based at least in part on feedback of a recommendation generated in response to a previous profile of the group determined by the dynamics identifier.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
using a processor-based machine to determine at least one dynamic interaction characteristic of a group of users that are interacting with a machine, the at least one dynamic interaction characteristic indicating interaction among at least some of the group of users; and
based at least in part on the at least one determined dynamic interaction characteristic, determine a profile of the group for a recommendation engine of a content provider.

2. The method of claim 1, further comprising:
determining a profile of at least one of the users; and
further basing the determination of the profile of the group based at least in part on the determined profile.

3. The method of claim 1, wherein using the processor-based machine to determine at least one dynamic interaction characteristic comprises determining an engagement of at least one of the users with an activity being performed by the group.

4. The method of claim 1, wherein using the processor-based machine to determine the at least one dynamic interaction characteristic comprises determining an age of at least one of the users.

5. The method of claim 1, wherein using the processor-based machine to determine the at least one dynamic interaction characteristic comprises processing input data provided by at least one of the users.

6. The method of claim 1, further comprising determining profiles of the users, wherein determining the profile of the group further comprises:
based at least in part on the at least one determined dynamic interaction characteristic, selectively combining the determined user profiles.

7. The method of claim 6, wherein combining the determined user profiles comprises combining the user profiles based at least in part on a determined degree of similarity among the determined user profiles.

8. The method of claim 6, wherein combining the determined user profiles comprises combining the user profiles based at least in part on determined engagements of the users in an activity being performed by the group.

9. The method of claim 6, wherein each of the user profiles comprises keywords associated with preferences of the associated individual, and combining the profiles comprises performing an intersection of the keywords.

10. The method of claim 6, wherein each of the user profiles comprises keywords associated with preferences of the associated individual, and combining the profiles comprises performing a union of the keywords.

11. At least one non-transitory machine readable medium comprising a plurality of instruction that in response to being executed on a computing device, cause the computing devise to:
determine at least one dynamic interaction characteristic of a group of users that are interacting with a machine, the at least one dynamic interaction characteristic indicating interaction among at least some users of the group of users; and
based at least in part on the at least one determined dynamic interaction characteristic, determine a profile of the group for a recommendation engine of a content provider.

12. An apparatus comprising:
a processor adapted to:
determine at least one dynamic interaction characteristic of a group of users that are interacting with a machine, the at least one dynamic interaction characteristic indicating interaction among at least some users of the group of users; and
based at least in part on the at least one determined dynamic interaction characteristic, determine a profile of the group for a recommendation engine of a content provider.

13. An apparatus comprising:
at least one sensor to indicate the presence and an activity of at least one user of a plurality of users of a group interacting with a machine; and
a processor-based dynamics identifier to determine at least one dynamic interaction characteristic of the group and determine a profile of the group for a recommendation engine of a content provider based at least in part on the at least one determined characteristic, the at least one dynamic interaction characteristic indicating interaction among at least some users of the group of users.

14. The apparatus of claim 13, wherein the at least one sensor comprises at least one or more of the following:
a camera;
an application; and
an audio input device.

15. The apparatus of claim 13, wherein the dynamics identifier is adapted to determine the profile based at least in part on at least one rating provided by at least one of the users.

16. The apparatus of claim 13, wherein the dynamics identifier is adapted to determine the at least one dynamic interaction characteristic based at least in part on at least one rating of a recommendation generated in response to a previous profile of the group determined by the dynamics identifier.

17. The apparatus of claim 13, further comprising determining profiles of the users, wherein determining the profile of the group further comprises:
based at least in part on the at least one determined dynamic interaction characteristic, selectively combining the determined user profiles.

18. The apparatus of claim 17, wherein combining the determined user profiles comprises combining the user profiles based at least in part on a determined degree of similarity among the determined user profiles.

19. The apparatus of claim 17, wherein combining the determined user profiles comprises combining the determined user profiles based at least in part on determined engagements of the users in an activity being performed by the group.

20. The apparatus of claim 17, wherein each of the user profiles comprises keywords associated with preferences of the associated user, and combining the user profiles comprises performing an intersection of the keywords.

21. The at least one non-transitory machine readable medium of claim 11, comprising a plurality of instructions that in response to being executed on the computing device cause the computing device to suggest recommendations associated with the machine based at least in part on the determined profile of the group.

22. The at least one non-transitory machine readable medium of claim 11, comprising a plurality of instructions that in response to being executed on the computing device cause the computing device to:
determine a profile of at least one of the users; and
further basing the determination of the profile of the group based at least in part on the determined profile.

23. The at least one non-transitory machine readable medium of claim 11, comprising a plurality of instructions that in response to being executed on the computing device cause the computing device to determine an engagement of at least one of the users with an activity being performed by the group.

24. The at least one non-transitory machine readable medium of claim 11, comprising a plurality of instructions that in response to being executed on the computing device cause the computing device to determine an age of at least one of the users.

25. The at least one non-transitory machine readable medium of claim 11, comprising a plurality of instructions that in response to being executed on the computing device cause the computing device to process input data provided by at least one of the users.

26. The at least one non-transitory machine readable medium of claim 11, comprising a plurality of instructions that in response to being executed on the computing device cause the computing device to, based at least in part on the one determined dynamic interaction characteristic, selectively combine the determined user profiles.

27. The at least one non-transitory machine readable medium of claim 26, comprising a plurality of instructions that in response to being executed on the computing device cause the computing device to combine the user profiles based at least in part on a determined degree of similarity among the determined user profiles.

28. The at least one non-transitory machine readable of claim 26, comprising a plurality of instructions that in response to being executed on the computing device cause the computing device to combine the user profiles based at least in part on determined engagements of the users in an activity being performed by the group.

29. The at least one non-transitory machine readable medium of claim 26, wherein each of the user profiles comprises keywords associated with preferences of the associated individual, and wherein the at least one non-transitory readable medium comprises a plurality of instructions that in response to being executed on the computing device cause the computing device to combine the profiles by performing an intersection of the keywords.

30. The at least one non-transitory machine readable medium of claim 26, wherein each of the users profiles comprises keywords associated with preferences of the associated individual, and wherein the at least one non-transitory machine readable medium comprises a plurality of instructions that in response to being executed on the computing device cause the computing device to combine the profiles by performing a union of the keywords.

31. The apparatus of claim 12, wherein the processor:
determines a profile of at least one of the users; and
further bases the determination of the profile of the group based at least in part on the determined profile.

32. The apparatus of claim 12, wherein the processor determines an engagement of at least one of the users with an activity being performed by the group.

33. The apparatus of claim 12, wherein the processor determines the at least one dynamic interaction characteristic by determining an age of at least one of the users.

34. The apparatus of claim 12, wherein the processor determines the at least one dynamic interaction characteristic by processing input data provided by at least one of the users.

35. The apparatus of claim 12, wherein the processor selectively combines the determined user profiles based in part on the at least one determined dynamic interaction characteristic.

36. The apparatus of claim 35, wherein the processor combine the determined user profiles by combining the user profiles based in part on a determined degree of similarity among the determined user profiles or combining the user profiles based at least in part on determined engagements of the users in an activity being performed by the group.

37. The apparatus of claim 35, wherein each of the user profiles comprises keywords associated with preferences of the associated individual, and the processor combines the profiles by performing an intersection of the keywords or performing a union of the keywords.

* * * * *